J. TOBIN.
NUT LOCK.
APPLICATION FILED NOV. 27, 1911.
1,029,775.
Patented June 18, 1912.
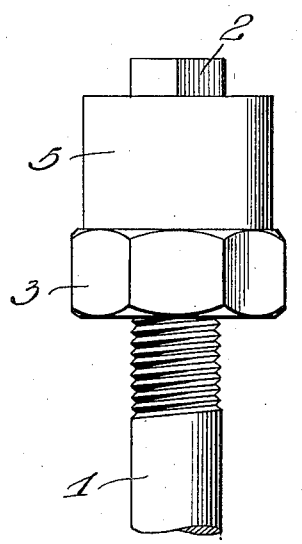
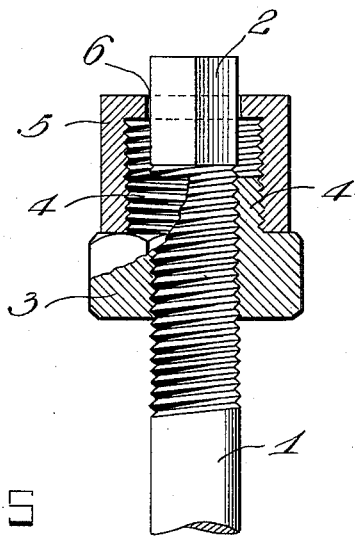
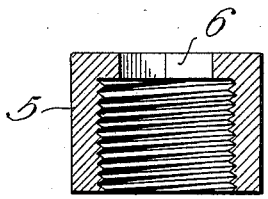
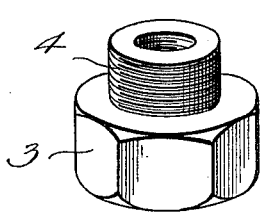
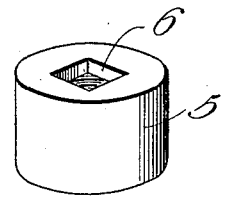
Witnesses
Inventor
James Tobin
by Attorneys

UNITED STATES PATENT OFFICE.

JAMES TOBIN, OF ST. BONIFACIUS, PENNSYLVANIA.

NUT-LOCK.

1,029,775.  Specification of Letters Patent.  Patented June 18, 1912.

Application filed November 27, 1911. Serial No. 662,668.

*To all whom it may concern:*

Be it known that I, JAMES TOBIN, a citizen of the United States, residing at St. Bonifacius, in the county of Cambria and State of Pennsylvania, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a nut lock having a simple and improved construction and arrangement of nut locking mechanism which may be readily engaged with the bolt and nut and which when so engaged will securely hold the nut against turning on the bolt.

With this and other objects in view, the invention consists of certain novel features of construction, and the combination and arrangement of parts as will be more fully described and claimed.

In the accompanying drawings: Figure 1 is a side view of a bolt and nut showing the invention applied thereto; Fig. 2 is a central longitudinal section of the same; Fig. 3 is a detail perspective view of the nut; Fig. 4 is a perspective view of the locking member for the nut; and, Fig. 5 is a central longitudinal section of the same.

Referring more particularly to the drawings, 1 denotes the bolt, said bolt having a squared or irregular outer end 2. Adapted to be screwed onto the bolt is a nut 3 which may be of any suitable shape and which is provided on its outer end with a cylindrical extension or nipple 4. The extension or nipple 4 is threaded interiorly the same as the nut, the threads in the nipple forming a continuation of the nut threads. The nipple or extension 4 is also exteriorly threaded with left hand threads or in the opposite direction from the interior threads thereof. Slidably engaged with the outer end of the bolt is a nut locking member comprising a socket or thimble 5 having an open inner end and a closed outer end, said closed outer end being provided with a rectangular or irregularly shaped passage 6 corresponding to the shape of the outer end of the bolt and through which said outer end of the bolt passes when the thimble is engaged therewith. The thimble or socket 5 is interiorly threaded to correspond with the threaded outer surface of the nipple or extension 4 which is adapted to be screwed into the inner end of the socket to lock the nut in engagement with the bolt.

In applying the lock the nut is first screwed onto the bolt for a suitable distance after which the locking member or socket 5 is engaged with the bolt with the square end of the latter projecting through the passage 6 in the closed outer end of the socket. When thus engaged the socket or thimble is slipped inwardly on the bolt until the inner end of the socket comes into engagement with the outer end of the nipple or extension 4 on the nut. When thus engaged the nut is again turned in the proper direction for screwing the same inwardly on the bolt whereupon the oppositely threaded nipple will screw into the socket, thus drawing the same farther inwardly on the squared outer end of the bolt. This engagement of the threaded nipple 4 with the socket holds the latter in position on the bolt and the engagement of the rectangular passage in the end of the socket with the squared end of the bolt holds the same against turning on the bolt and thus locks the nut in its adjusted position on the bolt.

From the foregoing description taken in connection with the accompanying drawings the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. A nut lock comprising a bolt, a nut adapted to be screwed onto the bolt, said nut having on one end an extension, said extension being threaded on its outer surface in an opposite direction from the threads of the bolt, and a locking member having a sliding non-rotating engagement with the bolt, said member having its inner surface threaded to correspond with the outer threaded surface of the extension on the nut whereby the latter is screwed into the locking member thus locking the nut in its adjusted position.

2. In a nut lock, a bolt having an irregular outer end a nut adapted to be screwed onto said bolt, an extension formed on one end of said nut, said extension having its outer surface threaded in an opposite direction from the threads of the nut, a hollow locking member closed at one end and having in said closed end an irregular passage corresponding to the shape of the irregular end of the bolt with which said locking member is engaged, said locking member being threaded internally to correspond with the outer threaded surface of the extension on said nut whereby said extension is adapted to be screwed onto the locking member and the latter thus drawn inwardly on the irregular end of the bolt thereby locking the nut in its adjusted positions.

3. In a nut lock a bolt having a squared outer end, a nut adapted to be screwed onto the bolt, said nut having on one end a reduced cylindrical extension, said extension being interiorly threaded to correspond with the threads in the nut and having its outer surface threaded in an opposite direction, a locking member comprising a thimble having in its closed outer end a squared passage adapted to fit the squared end of the bolt when the latter is engaged therewith and having its inner surface threaded to correspond with the threaded outer surface of the extension on the nut, said extension being adapted to be screwed onto the end of the thimble thereby drawing the latter onto the squared end of the bolt and locking the nut in its adjusted positions.

In testimony whereof I have hereunto set my hand in presence of two subscribing witnesses.

JAMES TOBIN.

Witnesses:
　EDWARD F. DIXON,
　LEO DIXON.

Copies of this patent may be obtained for five cents each, by addressing the "Commissioner of Patents, Washington, D. C."